(12) United States Patent
Clavelle et al.

(10) Patent No.: US 12,479,984 B2
(45) Date of Patent: *Nov. 25, 2025

(54) PROCESSES FOR PRODUCING POLYETHYLENE CONTAINING RECYCLED POLYMERIC MATERIAL

(71) Applicant: NOVA Chemicals (International) S.A., Fribourg (CH)

(72) Inventors: Eric Clavelle, Calgary (CA); Yves Lacombe, Calgary (CA); Brian Molloy, Airdrie (CA); Niousha Kazemi, Calgary (CA); Mehdi Keshtkar, Calgary (CA); Fazle Sibtain, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 713 days.

This patent is subject to a terminal disclaimer.

(21) Appl. No.: 17/786,200

(22) PCT Filed: Dec. 16, 2020

(86) PCT No.: PCT/IB2020/062039
§ 371 (c)(1),
(2) Date: Jun. 16, 2022

(87) PCT Pub. No.: WO2021/124157
PCT Pub. Date: Jun. 24, 2021

(65) Prior Publication Data
US 2023/0045215 A1 Feb. 9, 2023

Related U.S. Application Data

(60) Provisional application No. 63/062,509, filed on Aug. 7, 2020, provisional application No. 62/951,245, filed on Dec. 20, 2019.

(51) Int. Cl.
*C08L 23/06* (2006.01)
*C08J 11/04* (2006.01)

(52) U.S. Cl.
CPC .............. *C08L 23/06* (2013.01); *C08J 11/04* (2013.01); *C08J 2300/30* (2013.01); *C08J 2323/06* (2013.01); *C08J 2400/30* (2013.01); *C08J 2423/06* (2013.01); *C08J 2423/08* (2013.01); *C08L 2205/025* (2013.01); *C08L 2207/20* (2013.01)

(58) Field of Classification Search
CPC ....................................................... C08L 23/06
See application file for complete search history.

(56) References Cited

U.S. PATENT DOCUMENTS

| 4,540,768 A * | 9/1985 | Speranza ........... C08G 18/4615 264/DIG. 83 |
| 6,420,497 B1 * | 7/2002 | Kufeld .................. C08F 210/16 522/132 |
| 8,609,778 B1 * | 12/2013 | Frost ........................ C08J 11/06 524/577 |
| 2013/0053461 A1 | 2/2013 | Alidedeoglu et al. |
| 2016/0297899 A1 * | 10/2016 | Banat ...................... C08F 10/06 |
| 2017/0107364 A1 * | 4/2017 | Trolez ..................... C08L 23/06 |
| 2018/0022842 A1 * | 1/2018 | Meier ................... C08F 110/02 526/65 |
| 2018/0305531 A1 * | 10/2018 | Zhang ................. C08L 23/0815 |
| 2023/0035963 A1 * | 2/2023 | Pires Fortes Ferreira ................... C08J 3/005 |

FOREIGN PATENT DOCUMENTS

| JP | 56032508 | * | 4/1981 |
| WO | WO-2013/033285 A1 | | 3/2013 |
| WO | WO-2015/169690 A1 | | 11/2015 |
| WO | WO-2016/005265 A1 | | 1/2016 |

OTHER PUBLICATIONS

International Search Report & Written Opinion of the International Searching Authority issued in PCT Application No. PCT/IB2020/062039, mailed Apr. 7, 2021.

* cited by examiner

*Primary Examiner* — Irina Krylova
(74) *Attorney, Agent, or Firm* — Thomas J. Styslinger

(57) ABSTRACT

Disclosed herein are polymerization processes where recycled polymeric material is fed to polymerization process to produce a blend of virgin polymer with recycled polymeric content.

19 Claims, No Drawings

PROCESSES FOR PRODUCING POLYETHYLENE CONTAINING RECYCLED POLYMERIC MATERIAL

CROSS REFERENCE TO RELATED APPLICATIONS

This application is a U.S. National Phase Application under 35 U.S.C. § 371 of International Application No. PCT/IB2020/062039, filed Dec. 16, 2020, which claims the benefit of priority to U.S. Provisional Application No. 62/951,245, filed Dec. 20, 2019, and 63/062,509, filed Aug. 7, 2020, all of which are hereby incorporated by reference in their entirety.

TECHNICAL FIELD

Provided in this disclosure are polymerization processes where recycled polymeric material is fed to a polymerization process to produce a blend of virgin polymer with recycled polymeric content.

BACKGROUND ART

Use of recycled plastic is of commercial interest as consumers demand retailers provide products in containers made partially or entirely of recycled plastic. Packaging manufacturers and polymer resin manufacturers need to work with brand owners to ensure these demands can be met. Recycled polymeric materials are available in a variety of forms ranging from waste materials produced and collected at the point of manufacture to commercially available post-consumer recycled streams.

Incorporation of recycled plastic into second and third use products remains a challenge technically, commercially, and financially.

SUMMARY OF INVENTION

Provided in this disclosure is a continuous polymerization process for the preparation of a polyethylene polymer blend product that includes a virgin polyethylene and a recycled polyethylene. The continuous polymerization process includes providing a slurry including the recycled polyethylene and a solvent to a continuous polymerization reactor. The process further includes providing ethylene to the continuous polymerization reactor in the presence of a first catalyst system to provide the polyethylene polymer blend product including the virgin polyethylene and the recycled polyethylene.

In some embodiments, the method further includes preparing the slurry including the recycled polyethylene and the solvent.

In some embodiments, providing ethylene to the continuous polymerization reactor in the presence of the first catalyst system to provide the polyethylene polymer blend product further includes providing at least one $C_4$ to $C_{10}$ alpha-olefin comonomer to the continuous polymerization reactor.

In some embodiments, the process further includes discharging the polyethylene polymer blend product from the continuous polymerization reactor into a tubular reactor to provide a second virgin polyethylene to provide a second polyethylene polymer blend product that includes the virgin polyethylene, the second virgin polyethylene, and the recycled polyethylene. In some embodiments, the process further includes providing ethylene to the tubular reactor under polymerization conditions.

In some embodiments, the process further includes discharging the polyethylene polymer blend product from the continuous polymerization reactor into a second continuous polymerization reactor in the presence of a second catalyst system and operating the second continuous polymerization reactor to provide a second virgin polyethylene to provide a second polyethylene polymer blend product that includes the virgin polyethylene, the second virgin polyethylene, and the recycled polyethylene. In some embodiments, the second polyethylene polymer blend product is discharged from the second continuous polymerization reactor into a tubular reactor. In some embodiments, ethylene is provided to the tubular reactor under polymerization conditions to provide a third virgin polyethylene to provide a third polyethylene polymer blend product including the virgin polyethylene, the second polyethylene, the third polyethylene, and the recycled polyethylene.

In some embodiments, the first catalyst system is a Ziegler Natta catalyst system.

In some embodiments, the first catalyst system is a single site catalyst system.

In some embodiments, the second catalyst system is a Ziegler Natta catalyst system.

In some embodiments, the second catalyst system is a single site catalyst system.

In some embodiments, the first continuous polymerization reactor is operated at a temperature from 100° C. to 200° C. For example, the first continuous polymerization reactor can be operated at a temperature from 100° C. to 140° C.

In some embodiments, the second continuous polymerization reactor is operated at a temperature of from 20° C. and 40° C. greater than the operating temperature of the first continuous polymerization reactor.

In some embodiments, the solvent used to make the slurry includes a solvent chosen from a $C_{5-12}$ hydrocarbon, a $C_{5-12}$ hydrocarbon substituted by a $C_{1-4}$ alkyl group, or a combination thereof.

In some embodiments, the solvent used to make the slurry includes a solvent chosen from pentane, methyl pentane, hexane, heptane, octane, cyclohexane, cyclopentane, methylcyclohexane, hydrogenated naphtha, or a combination thereof.

In some embodiments, each continuous polymerization reactor is operated at a pressure from 1,500 psi to 3,000 psi.

In some embodiments, hydrogen is added to at least one of continuous polymerization reactors.

In some embodiments, the polyethylene polymer blend product includes from 1% to 50% of the recycled polyethylene. For example, the polyethylene polymer blend product can include from 10% to 20% of the recycled polyethylene.

In some embodiments, the second polyethylene polymer blend product includes from 1% to 50% of the recycled polyethylene. For example, the second polyethylene polymer blend product can include from 10% to 20% of the recycled polyethylene.

Also provided herein is a continuous polymerization process for the preparation of a polyethylene polymer blend product that includes a first virgin polyethylene, a second virgin polyethylene, and a recycled polyethylene. The continuous polymerization process includes providing ethylene to a first continuous polymerization reactor in the presence of a first catalyst system to provide the first virgin polyethylene; discharging the first virgin polyethylene from the continuous polymerization reactor into a second continuous polymerization reactor; providing ethylene to the second continuous polymerization reactor in the presence of a second catalyst system to provide the second virgin polyethylene; and providing a slurry including the recycled polyethylene and a solvent to the second continuous polymerization reactor to provide the polyethylene polymer blend product.

In some embodiments, the method further includes preparing the slurry including the recycled polyethylene and the solvent.

In some embodiments, providing ethylene to the first continuous polymerization reactor in the presence of the first catalyst system to provide the polyethylene polymer blend product further includes providing at least one $C_4$ to $C_{10}$ alpha-olefin comonomer to the first continuous polymerization reactor.

In some embodiments, providing ethylene to the second continuous polymerization reactor in the presence of the second catalyst system to provide the polyethylene polymer blend product further includes providing at least one $C_4$ to $C_{10}$ alpha-olefin comonomer to the second continuous polymerization reactor.

In some embodiments, the process further includes discharging the polyethylene polymer blend product from the second continuous polymerization reactor into a tubular reactor to provide a second polyethylene polymer blend product. In some embodiments, the process further includes providing ethylene to the tubular reactor under polymerization conditions.

In some embodiments, the first catalyst system is a Ziegler Natta catalyst system.

In some embodiments, the first catalyst system is a single site catalyst system.

In some embodiments, the second catalyst system is a Ziegler Natta catalyst system.

In some embodiments, the second catalyst system is a single site catalyst system.

In some embodiments, the first continuous polymerization reactor is operated at a temperature from 100° C. to 200° C. For example, the first continuous polymerization reactor can be operated at a temperature from 100° C. to 140° C.

In some embodiments, the second continuous polymerization reactor is operated at a temperature from 20° C. and 40° C. greater than the operating temperature of the first continuous polymerization reactor.

In some embodiments, the solvent used to make the slurry includes a solvent chosen from chosen from a $C_{5-12}$ hydrocarbon, a $C_{5-12}$ hydrocarbon substituted by a $C_{1-4}$ alkyl group, or a combination thereof. In some embodiments, the solvent used to make the slurry includes a solvent chosen from pentane, methyl pentane, hexane, heptane, octane, cyclohexane, cyclopentane, methylcyclohexane, hydrogenated naphtha, or a combination thereof.

In some embodiments, each continuous polymerization reactor is operated at a pressure from 1,500 psi to 3,000 psi.

In some embodiments, hydrogen is added to at least one of continuous polymerization reactors.

In some embodiments, the polyethylene polymer blend product includes from 1% to 50% of the recycled polyethylene. For example, the polyethylene polymer blend product can include from 10% to 20% of the recycled polyethylene.

In some embodiments, the second polyethylene polymer blend product includes from 1% to 50% of the recycled polyethylene. For example, the second polyethylene polymer blend product can include from 10% to 20% of the recycled polyethylene.

Also provided herein, is a continuous polymerization process for the preparation of a polyethylene polymer blend product that includes a first virgin polyethylene, a second virgin polyethylene, and a recycled polyethylene. The continuous polymerization process includes providing ethylene to a continuous polymerization reactor in the presence of a first catalyst system to provide a first virgin polyethylene; discharging the first virgin polyethylene from the continuous polymerization reactor into a second continuous polymerization reactor; providing ethylene to the second continuous polymerization reactor in the presence of a second catalyst system to produce a second virgin polyethylene; discharging the first virgin polyethylene and the second virgin polyethylene from the second continuous polymerization reactor into a tubular reactor; providing a slurry including recycled polyethylene and a solvent to the tubular reactor to provide the polyethylene polymer blend product that includes the first virgin polyethylene, the second virgin polyethylene, and the recycled polyethylene; and discharging from the tubular reactor the polyethylene polymer blend product.

In some embodiments, the method further includes preparing the slurry that includes the recycled polyethylene and the solvent.

In some embodiments, providing ethylene to the first continuous polymerization reactor in the presence of the first catalyst system to provide the first virgin polyethylene further includes providing at least one $C_4$ to $C_{10}$ alpha-olefin comonomer to the first continuous polymerization reactor.

In some embodiments, providing ethylene to the second continuous polymerization reactor in the presence of the second catalyst system to provide the polyethylene polymer blend product further includes providing at least one $C_4$ to $C_{10}$ alpha-olefin comonomer to the second continuous polymerization reactor.

In some embodiments, the first catalyst system is a Ziegler Natta catalyst system.

In some embodiments, the first catalyst system is a single site catalyst system.

In some embodiments, the second catalyst system is a Ziegler Natta catalyst system.

In some embodiments, the second catalyst system is a single site catalyst system.

In some embodiments, the first continuous polymerization reactor is operated at a temperature from 100° C. to 200° C. For example, the first continuous polymerization reactor can be operated at a temperature from 100° C. to 140° C.

In some embodiments, the second continuous polymerization reactor is operated at a temperature from 20° C. and 40° C. greater than the operating temperature of the first continuous polymerization reactor.

In some embodiments, the solvent used to make the slurry includes a solvent chosen from a $C_{5-12}$ hydrocarbon, a $C_{5-12}$ hydrocarbon substituted by a $C_{1-4}$ alkyl group, or a combination thereof.

In some embodiments, the solvent used to make the slurry is includes a solvent chosen from pentane, methyl pentane, hexane, heptane, octane, cyclohexane, cyclopentane, methylcyclohexane, hydrogenated naphtha, or a combination thereof.

In some embodiments, each continuous polymerization reactor is operated at a pressure from 1,500 psi to 3,000 psi.

In some embodiments, hydrogen is added to at least one of continuous polymerization reactors.

In some embodiments, the polyethylene polymer blend product includes from 1% to 50% of the recycled polyethylene. For example, the polyethylene polymer blend product can include from 10% to 20% of the recycled polyethylene.

Also provided herein is a continuous polymerization process for the preparation of a polyethylene polymer blend product including a virgin polyethylene and a recycled polyethylene in a final continuous polymerization reactor. The continuous polymerization process includes providing ethylene to the final continuous polymerization reactor in the presence of a catalyst system to provide a virgin polyethylene and subsequently providing a slurry including the recycled polyethylene and a solvent to the final continuous polymerization reactor to provide the polyethylene polymer blend product.

In some embodiments, providing the slurry including the recycled polyethylene to the final continuous polymerization reactor includes mixing the recycled polyethylene and virgin polyethylene in a single-phase solvent.

In some embodiments, the process further includes separating the polyethylene polymer blend product from the solvent.

In some embodiments, the method further includes preparing the slurry including recycled polyethylene and the solvent.

In some embodiments, providing ethylene to the final continuous polymerization reactor in the presence of the catalyst system to provide the polyethylene polymer blend product further includes providing at least one $C_4$ to $C_{10}$ alpha-olefin comonomer to the final continuous polymerization reactor.

In some embodiments, the catalyst system is a Ziegler Natta catalyst system.

In some embodiments, the catalyst system is a single site catalyst system.

In some embodiments, the final continuous polymerization reactor is operated at a temperature from 100° C. to 200° C. For example, the final continuous polymerization reactor can be operated at a temperature from 100° C. to 140° C.

In some embodiments, the solvent used to make the slurry includes a solvent chosen from a $C_{5-12}$ hydrocarbon, a $C_{5-12}$ hydrocarbon substituted by a $C_{1-4}$ alkyl group, or a combination thereof.

In some embodiments, the solvent used to make the slurry is includes a solvent chosen from pentane, methyl pentane, hexane, heptane, octane, cyclohexane, cyclopentane, methylcyclohexane, hydrogenated naphtha, or a combination thereof.

In some embodiments, the final continuous polymerization reactor is operated at a pressure from 1,500 psi to 3,000 psi.

In some embodiments, hydrogen is added to the final continuous polymerization reactor.

In some embodiments, the polyethylene polymer blend product includes from 1% to 50% of the recycled polyethylene. For example, the polyethylene polymer blend product can include from 10% to 20% of the recycled polyethylene.

DESCRIPTION OF EMBODIMENTS

Provided in this disclosure are polymerization processes where recycled polymeric material is fed to polymerization process to produce a virgin polymer with recycled polymeric content. Feeding the recycled polymeric material can be accomplished using a slurry of either pellet or granular form, or using a solution created by chemical dissolution of the recycled polymeric material. In some embodiments, the introduction of recycled polymeric into the process in a slurry form may offer the advantage of better energy utilization and lower cost processes.

Recycled polymeric material can be introduced in a polymerization process several ways. For example, the recycled material can be fed into a solution polymerization process using an extruder, which is used to melt and pressurize the polymer into a solution process either directly or by first mixing with solvent. The recycled material can be introduced as a masterbatch. Another approach is to dissolve the recycle polymer in a stirred tank and pump the resulting polymer solution in the continuous polymerization process. This option can be capital intensive and complex as it requires additional heat exchangers, stirred tank and pump to heat, and mix the polymer solution.

Another approach is to introduce the recycled polymeric material as a slurry in the polymerization process. In some embodiments, this is advantageous because the recycled polymeric material slurry can be prepared in a low pressure and temperature environment and then pumped to the polymerization process. High pressure pumps for solid laden solvents can offer more flexibility and lower cost vis-à-vis extruders or polymer melt pumps. The recycled polymer slurry can be introduced in the reactor feed, or in between reactors (for multiple reactor scenarios) or after the reactors to be purely blended into the virgin polymer solution.

In some embodiments, the recycled polymer slurry can be introduced at one or more points during the continuous polymerization process, for example, into the first reactor and into the second reactor, or for example into the feed lines between the first two reactors and at the exit of the third reactor. These additions can occur at the same time or at different times. In these embodiments, additional recycled polymeric material can also be introduced as a masterbatch in the extruder, thereby allowing for final product blends that contain higher percentages of recycled polymeric material.

Feeding the recycled polymer slurry in the polymerization reactor can have multiple advantages. In embodiments using a continuous solution polymerization, introducing recycled polymeric material within the solution process can have the additional advantage of using the upstream process to melt the material prior to entering the extruder. In contrast, in pure compounding, a considerable amount of power can be consumed by the extruder to melt the recycled polymeric material.

As used herein, the phrase "leaving group" generally refers to one or more chemical moieties bound to the metal center of the catalyst compound that can be abstracted from the catalyst compound, thus producing a species active towards olefin polymerization or oligomerization.

As used herein, in reference to Periodic Table "Groups" of Elements, the "new" numbering scheme for the Periodic Table Groups are used as in the CRC Handbook of Chemistry and Physics (David R. Lide ed., CRC Press 81st ed. 2000).

The term "amido" is meant to convey its broad, conventional meaning. Thus, these ligands are characterized by: (a) a metal-nitrogen bond; and (b) the presence of two substituents (which are typically simple alkyl or silyl groups) on the nitrogen atom.

As used herein, a "hydrocarbyl" includes aliphatic, cyclic, olefinic, acetylenic and aromatic radicals (i.e. hydrocarbon radicals) including hydrogen and carbon that are deficient by one hydrogen. A "hydrocarbylene" is deficient by two hydrogens.

As used herein, an "alkyl" includes linear, branched and cyclic paraffin radicals that are deficient by one hydrogen. Thus, for example, a —$CH_3$ group ("methyl") and a $CH_3CH_2$— group ("ethyl") are examples of alkyls.

As used herein, an "alkenyl" includes linear, branched and cyclic olefin radicals that are deficient by one hydrogen;

alkynyl radicals include linear, branched and cyclic acetylene radicals deficient by one hydrogen radical.

As used herein, "aryl" groups include phenyl, naphthyl, pyridyl and other radicals whose molecules have the ring structure characteristic of benzene, naphthylene, phenanthrene, anthracene, etc. For example, a $C_6H_5$— aromatic structure is an "phenyl", a $C_6H_4^{2-}$ aromatic structure is an "phenylene". An "arylalkyl" group is an alkyl group having an aryl group pendant there from, examples of which include benzyl, phenethyl, tolylmethyl and the like; an "alkylaryl" is an aryl group having one or more alkyl groups pendant there from, examples of which include tolyl, xylyl, mesityl, cumyl and the like.

The terms "alkoxy" and "aryloxy" are also intended to convey their conventional meanings. Thus, these ligands are characterized by (a) a metal oxygen bond; and (b) the presence of a hydrocarbyl group bonded to the oxygen atom. The hydrocarbyl group may be a $C_{1-10}$ straight chained, branched or cyclic alkyl radical or a $C_{6-13}$ aromatic radical where the radicals are unsubstituted or further substituted by one or more $C_{1-4}$ alkyl radicals (e.g. 2,6 di-tertiary butyl phenoxy).

As used herein, an "alkylene" includes linear, branched and cyclic hydrocarbon radicals deficient by two hydrogens. Thus, —$CH_2$— ("methylene") and —$CH_2CH_2$— ("ethylene") are examples of alkylene groups. Other groups deficient by two hydrogen radicals include "arylene" and "alkenylene".

As used herein, the phrase "heteroatom" includes any atom other than carbon and hydrogen that can be bound to carbon. A "heteroatom-containing group" is a hydrocarbon radical that contains a heteroatom and may contain one or more of the same or different heteroatoms. In one embodiment, a heteroatom-containing group is a hydrocarbyl group containing from 1 to 3 atoms chosen from boron, aluminum, silicon, germanium, nitrogen, phosphorous, oxygen and sulfur. Non-limiting examples of heteroatom-containing groups include radicals of imines, amines, oxides, phosphines, ethers, ketones, oxoazolines heterocyclics, oxazolines, thioethers, and the like.

As used herein, "heterocyclic" refers to ring systems having a carbon backbone that include from 1 to 3 atoms chosen from boron, aluminum, silicon, germanium, nitrogen, phosphorous, oxygen and sulfur, unless the heteroatom (non-carbon atom) is described.

As used herein, an "alkylcarboxylate", "arylcarboxylate", and "alkylarylcarboxylate" is an alkyl, aryl, and alkylaryl, respectively, that possesses a carboxyl group in any position. Examples include $C_6H_5CH_2C(O)O$—, $CH_3C(O)O$—, etc.

As used herein, "non-interfering" means that the ligand (or cation) being referred to does not interfere with olefin polymerization (i.e. that it does not reduce the activity of olefin polymerization by more than 50% in comparison to a polymerization conducted in the absence of the ligand or cation).

As used herein, the term "substituted" means that the group following that term possesses at least one moiety in place of one or more hydrogens in any position, the moieties selected from such groups as halogen radicals (esp., Cl, F, Br), hydroxyl groups, carbonyl groups, carboxyl groups, amine groups, phosphine groups, alkoxy groups, phenyl groups, naphthyl groups, C1 to C10 alkyl groups, C2 to C10 alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals, and combinations thereof.

As used herein, structural formulas are employed as is commonly understood in the chemical arts; lines ("—") used to represent associations between a metal atom ("M", Group 3 to Group 15 atoms) and a ligand or ligand atom (e.g. cyclopentadienyl, nitrogen, oxygen, halogen ions, alkyl, etc.), as well as the phrases "associated with", "bonded to" and "bonding", are not limited to representing a certain type of chemical bond, as these lines and phrases are meant to represent a "chemical bond"; a "chemical bond" defined as an attractive force between atoms that is strong enough to permit the combined aggregate to function as a unit, or "compound".

Unless stated otherwise, no embodiment of the present disclosure is herein limited to the oxidation state of the metal atom "M" as defined below in the individual descriptions and examples that follow. The ligation of the metal atom "M" is such that the compounds described herein are neutral, unless otherwise indicated.

As used herein "virgin polymer" or "virgin polyethylene" or "vPE" refers to polymers or polyethylenes made and used directly from a traditional lab scale, pilot scale, demonstration scales or commercial scale apparatus.

As used herein "recycled polymer" or "recycled polymeric material" refers to plastic materials that have been recovered or otherwise diverted from the solid waste stream. Recycled polymers diverted either during the manufacturing process or after the manufacturing process but before consumer use is sometimes referred to as post-industrial resin, post-industrial recycle, or PIR. Recycled materials recovered after consumer use is sometimes referred to as post-consumer recycled resins, or PCR. The term "recycled" refers to both PIR and PCR. Either material, or blends of both, are suitable for use as disclosed herein. Both PCR and PIR materials can be purchased commercially. In one embodiment ECOPRIME® resin from Envision Plastics, 3101 Towercreek Parkway, Suite 300, Atlanta, Georgia 30339 can be used.

Commercially available PIR and PCR can vary in composition, as they are often a mixture of polar and/or non-polar materials like: polyethylene (PE), polypropylene homopolymer, polypropylene impact copolymers, polypropylene random copolymer, polyethylene terephthalate, ethylene vinyl alcohol, polyamide, grafted polyolefins, just to name a few. In some embodiments, the recycled polymeric material is derived from polyethylene products so that the PCR is primarily (>85%, >90%, or great than 95%) polyethylene with known contaminants such as inks, antioxidants, metals, or other additives found in consumer plastic goods. In other embodiments, the recycled polymeric material is primarily a mixture of polyolefins (>85%, >90%, or great than 95% of the polyolefin) with known contaminants such as inks, antioxidants, metals, or other additives found in consumer plastic goods.

The recycled polymeric material can primarily be a mixture of polyolefins (>85%, >90%, or great than 95% of the polyolefin) with known contaminants such as inks, antioxidants, metals, or other additives found in consumer plastic goods. In other embodiments, the recycled polymeric material is a mixture of polyolefins with polymers containing polar groups. In instances of traditional melt blending of materials, incompatibility between the varying kinds of polymeric materials in PCR and the virgin polymers with which they may be blended or compounded, may result in a final product with poor mechanical and optical properties.

As used herein "recycled polyethylene" or "rPE" refers to polyethylene that has been recovered or otherwise diverted from the solid waste stream. In some embodiments rPE can be simulated by exposing virgin polyethylene exposed to at least one, and, in some embodiments several, heat histories. It will be appreciated by those skilled in the art that polyethylene is typically converted into finished goods in processes that involve melting the polyethylene and then forming it into the finished good. The melting process is referred to as a "heat history."

As used herein "slurry" refers to a mixture including polymer particles and a solvent. The slurry may contain additional components. The particle may vary in average size, size distribution and concentration in the slurry. Solvents useful for creating the slurry include $C_{5-12}$ hydrocarbon, which may be unsubstituted or substituted by a $C_{1-4}$ alkyl group, such as pentane, methyl pentane, hexane, heptane, octane, cyclopentane, cyclohexane, methylcyclohexane and hydrogenated naphtha. An example of a suitable solvent which is commercially available is "Isopar E" ($C_{8-12}$ aliphatic solvent, Exxon Chemical Co.). In some embodiments, the solvent used for the slurry may also be the monomer or comonomer of the primary polymerization reaction.

Provided in this disclosure is a continuous polymerization process for the preparation of a polyethylene polymer blend product that includes a virgin polyethylene and a recycled polyethylene. The continuous polymerization process includes providing a slurry including the recycled polyethylene and a solvent to a continuous polymerization reactor. The process further includes providing ethylene to the continuous polymerization reactor in the presence of a first catalyst system to provide the polyethylene polymer blend product including the virgin polyethylene and the recycled polyethylene.

In some embodiments, the method further includes preparing the slurry including the recycled polyethylene and the solvent.

In some embodiments, providing ethylene to the continuous polymerization reactor in the presence of the first catalyst system to provide the polyethylene polymer blend product further includes providing at least one $C_4$ to $C_{10}$ alpha-olefin comonomer to the continuous polymerization reactor.

In some embodiments, the process further includes discharging the polyethylene polymer blend product from the continuous polymerization reactor into a tubular reactor to provide a second virgin polyethylene to provide a second polyethylene polymer blend product that includes the virgin polyethylene, the second virgin polyethylene, and the recycled polyethylene. In some embodiments, the process further includes providing ethylene to the tubular reactor under polymerization conditions.

In some embodiments, the process further includes discharging the polyethylene polymer blend product from the continuous polymerization reactor into a second continuous polymerization reactor in the presence of a second catalyst system and operating the second continuous polymerization reactor to provide a second virgin polyethylene to provide a second polyethylene polymer blend product that includes the virgin polyethylene, the second virgin polyethylene, and the recycled polyethylene. In some embodiments, the second polyethylene polymer blend product is discharged from the second continuous polymerization reactor into a tubular reactor. In some embodiments, ethylene is provided to the tubular reactor under polymerization conditions to provide a third virgin polyethylene to provide a third polyethylene polymer blend product including the virgin polyethylene, the second polyethylene, the third polyethylene, and the recycled polyethylene.

In some embodiments, the first catalyst system is a Ziegler Natta catalyst system.

In some embodiments, the first catalyst system is a single site catalyst system.

In some embodiments, the second catalyst system is a Ziegler Natta catalyst system.

In some embodiments, the second catalyst system is a single site catalyst system.

In some embodiments, the first continuous polymerization reactor is operated at a temperature from 100° C. to 200° C. For example, the first continuous polymerization reactor can be operated at a temperature from 100° C. to 140° C.

In some embodiments, the second continuous polymerization reactor is operated at a temperature of from 20° C. and 40° C. greater than the operating temperature of the first continuous polymerization reactor.

In some embodiments, the solvent used to make the slurry includes a solvent chosen from a $C_{5-12}$ hydrocarbon, a $C_{5-12}$ hydrocarbon substituted by a $C_{1-4}$ alkyl group, or a combination thereof.

In some embodiments, the solvent used to make the slurry includes a solvent chosen from pentane, methyl pentane, hexane, heptane, octane, cyclohexane, cyclopentane, methylcyclohexane, hydrogenated naphtha, or a combination thereof.

In some embodiments, each continuous polymerization reactor is operated at a pressure from 1,500 psi to 3,000 psi.

In some embodiments, hydrogen is added to at least one of continuous polymerization reactors.

In some embodiments, the polyethylene polymer blend product includes from 1% to 50% of the recycled polyethylene. For example, the polyethylene polymer blend product can include from 10% to 20% of the recycled polyethylene.

In some embodiments, the second polyethylene polymer blend product includes from 1% to 50% of the recycled polyethylene. For example, the second polyethylene polymer blend product can include from 10% to 20% of the recycled polyethylene.

Also provided herein is a continuous polymerization process for the preparation of a polyethylene polymer blend product that includes a first virgin polyethylene, a second virgin polyethylene, and a recycled polyethylene. The continuous polymerization process includes providing ethylene to a first continuous polymerization reactor in the presence of a first catalyst system to provide the first virgin polyethylene; discharging the first virgin polyethylene from the continuous polymerization reactor into a second continuous polymerization reactor; providing ethylene to the second continuous polymerization reactor in the presence of a second catalyst system to provide the second virgin polyethylene; and providing a slurry including the recycled polyethylene and a solvent to the second continuous polymerization reactor to provide the polyethylene polymer blend product.

In some embodiments, the method further includes preparing the slurry including the recycled polyethylene and the solvent.

In some embodiments, providing ethylene to the first continuous polymerization reactor in the presence of the first catalyst system to provide the polyethylene polymer blend product further includes providing at least one $C_4$ to $C_{10}$ alpha-olefin comonomer to the first continuous polymerization reactor.

In some embodiments, providing ethylene to the second continuous polymerization reactor in the presence of the second catalyst system to provide the polyethylene polymer blend product further includes providing at least one $C_4$ to $C_{10}$ alpha-olefin comonomer to the second continuous polymerization reactor.

In some embodiments, the process further includes discharging the polyethylene polymer blend product from the second continuous polymerization reactor into a tubular reactor to provide a second polyethylene polymer blend product. In some embodiments, the process further includes providing ethylene to the tubular reactor under polymerization conditions.

In some embodiments, the first catalyst system is a Ziegler Natta catalyst system.

In some embodiments, the first catalyst system is a single site catalyst system.

In some embodiments, the second catalyst system is a Ziegler Natta catalyst system.

In some embodiments, the second catalyst system is a single site catalyst system.

In some embodiments, the first continuous polymerization reactor is operated at a temperature from 100° C. to 200° C. For example, the first continuous polymerization reactor can be operated at a temperature from 100° C. to 140° C.

In some embodiments, the second continuous polymerization reactor is operated at a temperature from 20° C. and 40° C. greater than the operating temperature of the first continuous polymerization reactor.

In some embodiments, the solvent used to make the slurry includes a solvent chosen from chosen from a $C_{5-12}$ hydrocarbon, a $C_{5-12}$ hydrocarbon substituted by a $C_{1-4}$ alkyl group, or a combination thereof. In some embodiments, the solvent used to make the slurry includes a solvent chosen from pentane, methyl pentane, hexane, heptane, octane, cyclohexane, cyclopentane, methylcyclohexane, hydrogenated naphtha, or a combination thereof.

In some embodiments, each continuous polymerization reactor is operated at a pressure from 1,500 psi to 3,000 psi.

In some embodiments, hydrogen is added to at least one of continuous polymerization reactors.

In some embodiments, the polyethylene polymer blend product includes from 1% to 50% of the recycled polyethylene. For example, the polyethylene polymer blend product can include from 10% to 20% of the recycled polyethylene.

In some embodiments, the second polyethylene polymer blend product includes from 1% to 50% of the recycled polyethylene. For example, the second polyethylene polymer blend product can include from 10% to 20% of the recycled polyethylene.

Also provided herein, is a continuous polymerization process for the preparation of a polyethylene polymer blend product that includes a first virgin polyethylene, a second virgin polyethylene, and a recycled polyethylene. The continuous polymerization process includes providing ethylene to a continuous polymerization reactor in the presence of a first catalyst system to provide a first virgin polyethylene; discharging the first virgin polyethylene from the continuous polymerization reactor into a second continuous polymerization reactor; providing ethylene to the second continuous polymerization reactor in the presence of a second catalyst system to produce a second virgin polyethylene; discharging the first virgin polyethylene and the second virgin polyethylene from the second continuous polymerization reactor into a tubular reactor; providing a slurry including recycled polyethylene and a solvent to the tubular reactor to provide the polyethylene polymer blend product that includes the first virgin polyethylene, the second virgin polyethylene, and the recycled polyethylene; and discharging from the tubular reactor the polyethylene polymer blend product.

In some embodiments, the method further includes preparing the slurry that includes the recycled polyethylene and the solvent.

In some embodiments, providing ethylene to the first continuous polymerization reactor in the presence of the first catalyst system to provide the first virgin polyethylene further includes providing at least one $C_4$ to $C_{10}$ alpha-olefin comonomer to the first continuous polymerization reactor.

In some embodiments, providing ethylene to the second continuous polymerization reactor in the presence of the second catalyst system to provide the polyethylene polymer blend product further includes providing at least one $C_4$ to $C_{10}$ alpha-olefin comonomer to the second continuous polymerization reactor.

In some embodiments, the first catalyst system is a Ziegler Natta catalyst system.

In some embodiments, the first catalyst system is a single site catalyst system.

In some embodiments, the second catalyst system is a Ziegler Natta catalyst system.

In some embodiments, the second catalyst system is a single site catalyst system.

In some embodiments, the first continuous polymerization reactor is operated at a temperature from 100° C. to 200° C. For example, the first continuous polymerization reactor can be operated at a temperature from 100° C. to 140° C.

In some embodiments, the second continuous polymerization reactor is operated at a temperature from 20° C. and 40° C. greater than the operating temperature of the first continuous polymerization reactor.

In some embodiments, the solvent used to make the slurry includes a solvent chosen from a $C_{5-12}$ hydrocarbon, a $C_{5-12}$ hydrocarbon substituted by a $C_{1-4}$ alkyl group, or a combination thereof.

In some embodiments, the solvent used to make the slurry is includes a solvent chosen from pentane, methyl pentane, hexane, heptane, octane, cyclohexane, cyclopentane, methylcyclohexane, hydrogenated naphtha, or a combination thereof.

In some embodiments, each continuous polymerization reactor is operated at a pressure from 1,500 psi to 3,000 psi.

In some embodiments, hydrogen is added to at least one of continuous polymerization reactors.

In some embodiments, the polyethylene polymer blend product includes from 1% to 50% of the recycled polyethylene. For example, the polyethylene polymer blend product can include from 10% to 20% of the recycled polyethylene.

Also provided herein is a continuous polymerization process for the preparation of a polyethylene polymer blend product including a virgin polyethylene and a recycled polyethylene in a final continuous polymerization reactor. The continuous polymerization process includes providing ethylene to the final continuous polymerization reactor in the presence of a catalyst system to provide a virgin polyethylene and subsequently providing a slurry including the recycled polyethylene and a solvent to the final continuous polymerization reactor to provide the polyethylene polymer blend product.

In some embodiments, providing the slurry including the recycled polyethylene to the final continuous polymerization reactor includes mixing the recycled polyethylene and virgin polyethylene in a single-phase solvent.

In some embodiments, the process further includes separating the polyethylene polymer blend product from the solvent.

In some embodiments, the method further includes preparing the slurry including recycled polyethylene and the solvent.

In some embodiments, providing ethylene to the final continuous polymerization reactor in the presence of the catalyst system to provide the polyethylene polymer blend product further includes providing at least one $C_4$ to $C_{10}$ alpha-olefin comonomer to the final continuous polymerization reactor.

In some embodiments, the catalyst system is a Ziegler Natta catalyst system.

In some embodiments, the catalyst system is a single site catalyst system.

In some embodiments, the final continuous polymerization reactor is operated at a temperature from 100° C. to 200° C. For example, the final continuous polymerization reactor can be operated at a temperature from 100° C. to 140° C.

In some embodiments, the solvent used to make the slurry includes a solvent chosen from a $C_{5-12}$ hydrocarbon, a $C_{5-12}$ hydrocarbon substituted by a $C_{1-4}$ alkyl group, or a combination thereof.

In some embodiments, the solvent used to make the slurry is includes a solvent chosen from pentane, methyl pentane, hexane, heptane, octane, cyclohexane, cyclopentane, methylcyclohexane, hydrogenated naphtha, or a combination thereof.

In some embodiments, the final continuous polymerization reactor is operated at a pressure from 1,500 psi to 3,000 psi.

In some embodiments, hydrogen is added to the final continuous polymerization reactor.

In some embodiments, the polyethylene polymer blend product includes from 1% to 50% of the recycled polyethylene. For example, the polyethylene polymer blend product can include from 10% to 20% of the recycled polyethylene.

For the processes disclosed herein, the average particle sizes of recycled polymer slurry can vary from 0.1 µm to 500 µm, or for example from 1 µm to 200 µm, or from 100 inn to 300 µm. Particle size distribution can vary in any given sample. In some embodiments, the average particle sizes of the recycled polymer slurry can vary from 1 mm to 7 mm or from 2 mm to 5 mm. In some embodiments, the recycled polymer slurry particle is similar in size to commercially available pellets of virgin polymers, such as polyethylene. The size of the particle chosen can depend on the size of the reactor being used and the size of the feedline into the reactor.

Larger recycled polymer particles can be ground to smaller sizes using any known technique. In addition, companies such as Allgrind Plastics, 6 Vliet Farm Rd, Asbury, NJ 08802, United States, can provide materials ground to desired sizes regimes.

Particle size and distribution can be calculated using laser diffraction PSA. Laser diffraction PSA is conducted with Malvern Instruments MS3000, using what is known as "dry dispersion" or air.

Examples of reactors useful for the continuous polymerization processes disclosed herein are continuous stirred tank reactors, tubular reactors, loop flow reactors, cooled loop reactors, and fluidized bed reactors. In some embodiments, the continuous polymerization processes include one continuous stirred tank reactor, or two continuous stirred tank reactors or one continuous stirred tank reactor and a tubular reactor, or two continuous stirred tank reactors and a tubular reactor. In some embodiments, where at least two reactors are used, the reactors are connected in series. In some embodiments, where at least two reactors are used, the reactors set up in parallel.

For the process disclosed herein, the recycled polymer slurry can be introduced or injected to a reactor with the other reactant feeds, such as the monomer feed, or the ethylene feed, or solvent feed, or catalyst feed. In some embodiments, the recycled polymer slurry can be added between the first and second reactor in the piping connecting the two reactors. In some embodiments, the recycled polymer slurry can be added between the second and third reactor in the piping connecting the two reactors. In some embodiments, the recycled polymer slurry can be added at any point at the end of the polymerization process at the exit of the last reactor up to the solution heater. For example, when there is a tubular reactor, introducing the slurry at its exit. In some embodiments, the recycled polymer slurry can be added at the end of the polymerization process at the exit of the last reactor and in the process after the solution heater. In some embodiments, the recycled polymer slurry can be introduced before or after introduction of the catalyst deactivator.

In some embodiments for the processes disclosed herein, when initiating or starting up the reaction, the recycled polymer slurry is introduced into the process before the solution polymerization reaction has started. In some embodiments, when initiating or starting up the reaction, recycled polymer slurry is introduced into the process after the solution polymerization reaction has started. In some embodiments, the recycled polymer slurry is introduced at the end of the production process after the reaction has been terminated using catalyst deactivator.

For the processes disclosed herein, the recycled polymer slurry or recycled polymer solution can be pre-heated in a suitable heat exchanger to bring the temperature closer to or above the recycled polymer's dissolving temperature before introduction to the process. The recycled polymer slurry or recycled polymer solution can be pre-chilled in a suitable heat exchanger to lower the slurry temperature and enhance the cooling provided by this flow in the reactor (thus increasing production rate).

Also contemplated by this disclosure are embodiments where the recycled polymeric material is prepared as a solution instead of a slurry, by dissolving the recycled material in a solvent. This dissolution may happen before introduction into the reaction stream. Or the particles may dissolve once in the reactor as a result of the heat of the reaction raising the temperature of the solvent sufficiently to cause the polymer to dissolve in the solvent. Or they may dissolve in the piping between continuous stirred tank reactors or in the tubular reactor due to the polymer solution being hot enough to do so.

Solution processes for the copolymerization of ethylene and an alpha olefin having from 3 to 12 carbon atoms are well known in the art. These processes are conducted in the presence of an inert hydrocarbon solvent typically a $C_{5-12}$ hydrocarbon which may be unsubstituted or substituted by a $C_{1-4}$ alkyl group, such as pentane, methyl pentane, hexane, heptane, octane, cyclopentane, cyclohexane, methylcyclohexane and hydrogenated naphtha. An example of a suitable solvent which is commercially available is "Isopar E" ($C_{8-12}$ aliphatic solvent, Exxon Chemical Co.).

In general, a continuous polymerization process may use one or more polymerization reactors. Any type of continuous polymerization reactor is contemplated alone or in combination with other continuous polymerization reactors. In some embodiments herein, the continuous polymerization process is a solution process that includes one CSTR. In some embodiments, the continuous polymerization process is a solution process that includes one CSTR in combination with an additional CSTR. In some embodiments, the continuous polymerization process is a solution process that includes one CSTR in combination with a tubular reactor. In some embodiments, the continuous polymerization process is a solution process that includes one CSTR in combination with an additional CSTR and a tubular reactor.

In some embodiments, the continuous polymerization process is a typical gas phase polymerization of olefins, run for example at 80° C. to 100° C. and 30-35 bar reactor pressure. The density of the products produced in this method may vary and may be, for example, between 0.91 and 0.97 g/cm$^3$. Typical catalysts employed for ethylene polymerization are Ziegler-Natta, metallocene coordination, and transition metal catalysts. A variety of solvents can be used for the recycled polymer slurry in gas phase reactors, including hexane, iso-pentane, and solvents that are also a comonomer of the polymerization reaction, such as olefins like butene, 1-hexene, and the like.

The polymerization temperature in at least one CSTR can be from 80° C. to 280° C. (for example from 120° C. to 220° C.) and the tubular reactor can be operated at a slightly higher temperature. Cold feed (i.e. chilled solvent and/or monomer) may be added to the CSTR(s). The polymerization enthalpy can heat the reactor. The polymerization solution that exits the reactor may be more than 100° C. hotter than the reactor feed temperature. Agitation efficiency in the CSTR may be determined by measuring the reactor temperature at several different points. The largest temperature difference (i.e. between the hottest and coldest temperature measurements) is described as the internal temperature gradient for the polymerization reactor. A very well mixed CSTR can have a maximum internal temperature gradient of less than 10° C. Pressures are from about 500 psi to 8,000 psi. In some embodiments, the reaction process is a "medium pressure process", which means that the pressure in each reactor is less than 6,000 psi (about 41,000 kiloPascals or kPa), or for example from 1,500 psi to 3,000 psi (about 10,000-21,000 kPa). Pressures can range from 10,000 to 40,000 kPa, or from 2,000 to 3,000 psi (about 14,000 to about 22,000 kPa), or from 725 psi to about 3,000 psi (about 5,000 to about 22,000 kPa).

If more than one CSTR is employed, catalyst can be added to each of the CSTRs. The catalyst used in each CSTR may be the same or different.

In some embodiments, a tubular reactor is connected to the discharge of a CSTR. (For clarity, if two CSTR's are used in series, then the tubular reactor receives the discharge from the second CSTR).

The term "tubular reactor" is meant to convey its conventional meaning—namely a simple tube. A tubular reactor can have a length/diameter (L/D) ratio of at least 10/1. In some embodiments, the tubular reactor is operated adiabatically. Thus, as polymerization progresses, the remaining comonomer is increasingly consumed and the temperature of the solution increases (both of which can improve the efficiency of separating the remaining comonomer from the polymer solution). In some embodiments, the temperature increase along the length of the tubular reactor is greater than 3° C. (i.e. that the discharge temperature from the tubular reactor is at least 3° C. greater than the discharge temperature from the CSTR that feeds the tubular reactor). In other embodiments, the temperature may not change, or the temperature change is greater than 0° C.

The tubular reactor used can have a feed port for additional ethylene and solvent. The feed can be tempered—that is the temperature of the additional ethylene and/or solvent is heated to above ambient (for example to about 100° C.) but the temperature is below the discharge temperature of the tubular reactor. In some embodiments, the ethylene is tempered to between 100° C. and 200° C. In some embodiments, the ethylene is added with solvent. The amount of solvent (expressed as a weight ratio, based on ethylene) can be from 20:1 to 0.1:1, or from 10:1 to 1:1.

In some embodiments, the tubular reactor has feed ports for additional catalyst, cocatalyst, comonomer, and/or telomerization agent (such as hydrogen).

The total volume of the tubular reactor can be at least 10 volume % of the volume of one CSTR, for example from 30% to 200%. The total amount of ethylene added to the tubular reactor can be for example from 1 to 50 weight percent (wt. %) of the total ethylene added to the CSTR(s). For example, if one CSTR is being operated with an ethylene flow rate of 1000 kg/hr, then the ethylene flow to the tubular reactor can be from 10 to 500 kg/hr. Similarly, if two CSTR(s) were being operated with an ethylene flow of 1000 kg/hr to the first and 500 kg/hr to the second, then the flow of ethylene to the tubular reactor can be from 15 to 750 kg/hr.

Suitable monomers for copolymerization with ethylene include $C_{3-20}$ mono- and diolefins. Example comonomers include $C_{3-12}$ alpha olefins which are unsubstituted or substituted by up to two $C_{1-6}$ alkyl radicals, $C_{8-12}$ vinyl aromatic monomers which are unsubstituted or substituted by up to two substituents selected from $C_{1-4}$ alkyl radicals, $C_{4-12}$ straight chained or cyclic diolefins which are unsubstituted or substituted by a $C_{1-4}$ alkyl radical. Illustrative non-limiting examples of such alpha-olefins are one or more of propylene, 1-butene, 1-pentene, 1-hexene, 1-octene and 1-decene, styrene, alpha methyl styrene, and constrained-ring cyclic olefins such as cyclobutene, cyclopentene, dicyclopentadiene norbornene, alkyl-substituted norbornenes, alkenyl-substituted norbornenes and the like (e.g. 5-methylene-2-norbornene and 5-ethylidene-2-norbornene, bicyclo-(2,2,1)-hepta-2,5-diene).

Co- and ter-polymers of ethylene, and one or more copolymerizable monomers can also be prepared using the methods described herein. In some embodiments, such polymers will contain 50 to 75 wt. % ethylene, or about 50 to 60 wt. % ethylene and correspondingly from 50 to 40 wt. % of propylene. A portion of the monomers, typically the propylene monomer, can be replaced by a conjugated diolefin. The diolefin can be present in amounts up to 10 wt. % of the polymer, for example the diolefin can be present in amounts from about 3 to 5 wt. %. The resulting polymer can have from 40 to 75 wt. % of ethylene, from 50 to 15 wt. % of propylene and up to 10 wt. % of a diene monomer to provide 100 wt. % of the polymer. Non-limiting examples of the dienes are dicyclopentadiene, 1,4-hexadiene, 5-methylene-2-norbornene, 5-ethylidene-2-norbornene and 5-vinyl-2-norbornene. In some embodiments, the diene is chosen from 5-ethylidene-2-norbornene 1,4-hexadiene, and 1,5-hexadiene.

In some embodiments, the resulting polymer can include not less than about 80, or not less than about 90 wt. % of ethylene and up to about 20, or less than 10 wt. % of one or more copolymerizable monomers. In some embodiments the comonomers are $C_{3-8}$ alpha olefins such as 1-butene, 1-hexene and 1-octene.

The monomers can be dissolved/dispersed in the inert hydrocarbon solvent prior to being fed to the first CSTR (or for gaseous monomers the monomer may be fed to the reactor so that it will dissolve in the reaction mixture). Prior to mixing, the solvent and monomers can be purified to remove potential catalyst poisons such as water, oxygen or other polar impurities. The feedstock purification can follow standard practices in the art, for example, molecular sieves, alumina beds and oxygen removal catalysts are used for the purification of monomers.

In some embodiments, the catalyst components are premixed in the solvent for the reaction or fed as separate streams to each reactor. In some embodiments, premixing may be desirable to provide a reaction time for the catalyst components prior to entering the first CSTR. Such an "in line mixing" technique is known in the art.

The residence time in each reactor can depend on the design and the capacity of the reactor. The reactors can be operated under conditions to achieve a thorough mixing of the reactants.

Any catalyst system that is capable of providing ethylene polymers under solution conditions may be employed.

Ziegler Natta polymerization catalysts may also be employed. These catalysts typically include a group 4 or group 5 metal, for example titanium or vanadium, in combination with hydrocarbyl aluminum activator of the general formula:

$$Al(R^{a1})_a(OR^{b1})_b(X)_c$$

where $R^{a1}$ is a hydrocarbyl group having from 1 to 10 carbon atoms; $OR^{b1}$ is an alkoxy or aryloxy group where $OR^{b1}$ is a hydrocarbyl fragment having from 1 to 10 carbon atoms and being bonded to oxygen; X is chloride or bromide and a+b+c=3, with the proviso that a is greater than 0. Examples of the hydrocarbyl aluminum activator in widespread use include trimethyl aluminum, trimethyl aluminum and tributyl aluminum.

Exemplary Ziegler Natta catalysts contain at least one of titanium or vanadium. Exemplary titanium compounds include titanium halides (for example titanium chlorides, of which $TiCl_4$ is a specific example); titanium alkyls; titanium alkoxides (which may be prepared by reacting a titanium alkyl with an alcohol) and "mixed ligand" compounds (i.e. compounds which contain more than one of the above described halide, alkyl and alkoxide ligands). Exemplary vanadium compounds may also contain halide, alkyl or alkoxide ligands. In addition, vanadium oxy trichloride ("$VOCl_3$") is known as a Ziegler Natta catalyst component and is suitable for use in the present disclosure.

As will be appreciated by those skilled in the art of ethylene polymerization, conventional Ziegler Natta catalysts may also incorporate additional components such as an electron donor (for example an amine or an ether) and/or a magnesium compound (for example a magnesium chloride and/or magnesium alkyl such as a butyl ethyl magnesium). A halide source (which is typically a chloride such as tertiary butyl chloride) is typically used when a magnesium alkyl compound is employed.

Such components, if employed, can be added to the other catalyst components prior to introduction to the reactor or may be directly added to the reactor.

In some embodiments, the Ziegler Natta catalyst contains a titanium compound, a magnesium alkyl compound and a chloride compound and an aluminum alkoxide is used as the cocatalyst.

The polymerization processes may also use an aluminum alkyl activator, for example trialkyl aluminum compounds or MAO.

In some embodiments, a well characterized organometallic compound is used as the catalyst compound in the process of this disclosure instead of, or in addition to, the Ziegler Natta catalyst. These catalyst compounds typically include a metal atom, at least one "functional" ligand and at least one leaving group.

Single site catalysts are also suitable catalysts for use herein. The term "single site catalyst" refers to a catalyst system that produces homogeneous ethylene polymers; which may or may not contain long chain branching. A non-limiting example includes the bulky ligand single site catalyst of the formula:

$$(L)_n-M-(Y)_p$$

wherein M is chosen from Ti, Zr, and Hf; L is a monoanionic ligand independently chosen from cyclopentadienyl-type ligands, and a bulky heteroatom ligand containing not less than five atoms in total (typically of which at least 20%, or at least 25% numerically are carbon atoms) and further containing at least one heteroatom chosen from boron, nitrogen, oxygen, phosphorus, sulfur and silicon, said bulky heteroatom ligand being sigma or pi-bonded to M; Y is independently chosen from activatable ligands; n may be from 1 to 3; and p may be from 1 to 3, provided that the sum of n+p equals the valence state of M, and further provided that two L ligands may be bridged.

Non-limiting examples of bridging groups include bridging groups containing at least one Group 13 to 16 atom, often referred to as a divalent moiety such as, but not limited to, at least one of a carbon, oxygen, nitrogen, silicon, boron, germanium and tin atom or a combination thereof. In some embodiments the bridging group contains a carbon, silicon or germanium atom, or for example, at least one silicon atom or at least one carbon atom. The bridging group may also contain substituent radicals, including halogens.

Some bridging groups include but are not limited to a di $C_{1-6}$ alkyl radical (e.g. alkylene radical for example an ethylene bridge), di $C_{6-10}$ aryl radical (e.g. a benzyl radical having two bonding positions available), silicon or germanium radicals substituted by one or more radicals chosen from $C_{1-6}$ alkyl, $C_{6-10}$ aryl, phosphine or amine radical which are unsubstituted or up to fully substituted by one or more $C_{1-6}$ alkyl or $C_{6-10}$ aryl radicals, or a hydrocarbyl radical such as a $C_{1-6}$ alkyl radical or a $C_{6-10}$ arylene (e.g. divalent aryl radicals); divalent $C_{1-6}$ alkoxide radicals (e.g. —$CH_2CHOHCH_2$—) and the like.

Exemplary of the silyl species of bridging groups are dimethylsilyl, methylphenylsilyl, diethylsilyl, ethylphenylsilyl or diphenylsilyl compounds.

Exemplary hydrocarbyl radicals for bridging groups include methylene, ethylene, propylene, butylene, phenylene, and the like.

Exemplary bridging amides include dimethylamide, diethylamide, methylethylamide, di-t-butylamide, diisoproylamide, and the like.

The term "cyclopentadienyl", frequently abbreviated as "Cp", refers to a 5-member carbon ring having delocalized bonding within the ring and typically being bound to the active catalyst site, generally a group 4 metal (M) through $\eta_5$-bonds. The cyclopentadienyl ligand may be unsubstituted or up to fully substituted with one or more substituents chosen from $C_{1-10}$ hydrocarbyl radicals in which hydrocarbyl substituents are unsubstituted or further substituted by one or more substituents chosen from a halogen atom and a $C_{1-4}$ alkyl radical; a halogen atom; a $C_{1-8}$ alkoxy radical; a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si—(R)$_3$ wherein each R is independently chosen from hydrogen, a $C_{1-8}$ alkyl or alkoxy radical, and $C_{6-10}$ aryl or aryloxy radicals; and germanyl radicals of the formula —Ge—(R)$_3$ wherein R is as defined above.

In some embodiments, the cyclopentadienyl-type ligand is chosen from a cyclopentadienyl radical, an indenyl radical and a fluorenyl radical where the radicals are unsubstituted or up to fully substituted by one or more substituents chosen from a fluorine atom, a chlorine atom; $C_{1-4}$ alkyl radicals; and a phenyl or benzyl radical which is unsubstituted or substituted by one or more fluorine atoms.

If none of the L ligands is bulky heteroatom ligand then the catalyst could be a bis-Cp catalyst (a traditional metallocene) or a bridged constrained geometry type catalyst or tris-Cp catalyst.

If the catalyst contains one or more bulky heteroatom ligands the catalyst would have the formula:

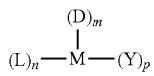

wherein M is a transition metal chosen from Ti, Hf and Zr; D is independently a bulky heteroatom ligand (as described below); L is a monoanionic ligand chosen from cyclopentadienyl-type ligands; Y is independently chosen from activatable ligands; m is 1 or 2; n is 0, 1 or 2; p is an integer; and the sum of m+n+p equals the valence state of M, provided that when m is 2, D may be the same or different bulky heteroatom ligands.

For example, the catalyst may be a bis(phosphinimine), or a mixed phosphinimine ketimide dichloride complex of titanium, zirconium or hafnium. Alternately, the catalyst could contain one phosphinimine ligand or one ketimide ligand, one "L" ligand (which is in some embodiments a cyclopentadienyl-type ligand) and two "Y" ligands (which are in some examples both chloride).

Exemplary metals (M) are from Group 4, for example titanium, hafnium or zirconium, or for example titanium. In one embodiment the catalysts are group 4 metal complexes in the highest oxidation state.

Bulky heteroatom ligands (D) include but are not limited to phosphinimine ligands (PI) and ketimide (ketimine) ligands.

The phosphinimine ligand (PI) is defined by the formula:

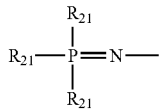

wherein each $R_{21}$ is independently chosen from a hydrogen atom; a halogen atom; $C_{1-20}$, for example $C_{1-10}$ hydrocarbyl radicals which are unsubstituted by or further substituted by a halogen atom; a $C_{1-8}$ alkoxy radical; a $C_{6-10}$ aryl or aryloxy radical; an amido radical; a silyl radical of the formula: —Si—(R$_{22}$)$_3$, wherein each $R_{22}$ is independently chosen from hydrogen, a $C_{1-8}$ alkyl or alkoxy radical, and $C_{6-10}$ aryl or aryloxy radicals; and a germanyl radical of the formula: —Ge—(R$_{22}$)$_3$, wherein $R_{22}$ is as defined above.

In some embodiments, the phosphinimines are those in which each $R_{21}$ is a hydrocarbyl radical, for example a $C_{1-6}$ hydrocarbyl radical.

Suitable phosphinimine catalysts are Group 4 organometallic complexes which contain one phosphinimine ligand (as described above) and one ligand L which is either a cyclopentadienyl-type ligand or a heteroatom ligand.

As used herein, the term "ketimide ligand" refers to a ligand which:

(a) is bonded to the transition metal via a metal-nitrogen atom bond;

(b) has a single substituent on the nitrogen atom (where this single substituent is a carbon atom which is doubly bonded to the N atom); and (c) has two substituents Sub$_1$ and Sub$_2$ (described below) which are bonded to the carbon atom.

Conditions a, b and c are illustrated below:

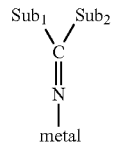

where the substituents Sub$_1$ and Sub$_2$ may be the same or different and may be further bonded together through a bridging group to form a ring. Exemplary substituents include hydrocarbyls having from 1 to 20 carbon atoms, for example from 3 to 6 carbon atoms, silyl groups (as described below), amido groups (as described below) and phosphido groups (as described below). In some embodiments, both of these substituents are hydrocarbyls, for example alkyls or for example tertiary butyl.

Suitable ketimide catalysts are Group 4 organometallic complexes which contain one ketimide ligand (as described above) and one ligand L which is either a cyclopentadienyl-type ligand or a heteroatom ligand.

The term bulky heteroatom ligand (D) is not limited to phosphinimine or ketimide ligands and includes ligands which contain at least one heteroatom chosen from boron, nitrogen, oxygen, phosphorus, sulfur and silicon. The heteroatom ligand may be sigma or pi-bonded to the metal. Exemplary heteroatom ligands include silicon-containing heteroatom ligands, amido ligands, alkoxy ligands, boron heterocyclic ligands and phosphole ligands, as all described below.

Silicon containing heteroatom ligands are defined by the formula:

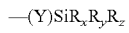

wherein the — denotes a bond to the transition metal and Y is sulfur or oxygen. The substituents on the Si atom, namely $R_x$, $R_y$ and $R_z$, satisfy the bonding orbital of the Si atom. The use of any particular substituent $R_x$, $R_y$ or $R_z$ is not especially important to success. In some embodiments each of $R_x$, $R_y$ and $R_z$ is a $C_{1-2}$ hydrocarbyl group (i.e. methyl or ethyl) simply because such materials are readily synthesized from commercially available materials.

Boron heterocyclic ligands are characterized by the presence of a boron atom in a closed ring ligand. This definition includes heterocyclic ligands which also contain a nitrogen atom in the ring. These ligands are well known to those skilled in the art of olefin polymerization.

The term "phosphole" is also meant to convey its conventional meaning. Phospholes are cyclic dienyl structures having four carbon atoms and one phosphorus atom in the closed ring. The simplest phosphole is $C_4PH_4$ (which is analogous to cyclopentadiene with one carbon in the ring being replaced by phosphorus). The phosphole ligands may be substituted with, for example, $C_{1-20}$ hydrocarbyl radicals (which may, optionally, contain halogen substituents); phosphido radicals; amido radicals; or silyl or alkoxy radicals.

The current disclosure also contemplates the use of chromium catalysts that are also well known in the art. The term "chromium catalysts" describes olefin polymerization catalysts including a chromium species, such as silyl chromate, chromium oxide, or chromocene on a metal oxide support such as silica or alumina. Suitable cocatalysts for chromium catalysts, are well known in the art, non-limiting examples include trialkylaluminum, alkylaluminoxane, dialkoxyalkylaluminum compounds and the like.

Another embodiment of this disclosure provides a polymer or copolymer that is a blend of virgin polyethylene and recycled polymeric material having a density from about 0.890 g/cc to about 0.960 g/cc. Another embodiment of this disclosure provides a polymer or copolymer that is a blend of virgin polyethylene and recycled polymeric material with CDBI50 octene greater than or equal to about 50. Another embodiment of this disclosure provides a polymer or copolymer that is a blend of virgin polyethylene and recycled polymeric material with a MWD from about 3 to about 8. Another embodiment of this disclosure provides a polymer or copolymer that is a blend of virgin polyethylene and recycled polymeric material with melt index from 0.2-150 g/10 min.

Another embodiment of this disclosure provides a polymer as described herein above for use in fabrication methods selected from extrusion, injection molding, thermoforming, and rotational molding.

Another embodiment of this disclosure provides a polymer as described herein above for use in plastic articles such as films, fibers, molded or thermoformed articles such as drums and agricultural spray tanks, and pipe coatings.

The present invention will further be described by reference to the following examples. The following examples are merely illustrative of the invention and are not intended to be limiting. Unless otherwise indicated, all percentages are by weight.

EXAMPLES

EcoPrime®
Source: Envision Plastic/envisionplastics.com
3101 Towercreek Parkway, Suite 300, Atlanta, Georgia. 30339

EcoPrime® is produced from post-consumer recycled HDPE (#2) bottles, such as milk and water jugs collected curbside across the United States. Envision purchases bales of natural HDPE bottles from waste haulers and community materials recovery facilities (MRFs) and sorts them further so that the feedstock is primarily food grade bottles that originally packaged milk, water, juice, and other food and beverage products. While the material is primarily included of polyethylene is does contain contaminants carried over from production of the material's initial use.

The material was ground at Allgrind Plastics Allgrind.com located at 6 Vliet Farm Rd, Asbury, NJ 08802.

Laser diffraction PSA is conducted with Malvern Instruments MS3000. The MS3000 software calculates particle size distributions by comparing a sample's scattering pattern with an optical model known as Mie Theory and that describes the scattering of electromagnetic radiation by a sphere. Since Mie Theory model assumes that the particles being measured are spherical, the size of irregular particles is expressed in terms of a spherical equivalent diameter, Dv. An assumption is made the measured particles scatter light in a way that approximates a sphere. The particle diameter, when measured via laser diffraction is the equivalent diameter of a sphere the same volume as the measured particle (Dv)—or "equivalent spheres". Unless otherwise specified, all measurements are based on the volume weighted, Dv, diameter. The absorption index of 0.1 is assumed and is used in this analysis. The density of the particles is estimated at 1.0 g/cm3 and a refractive index of 1.52.

TABLE 1

| | Record Number | Sample Name | Dx(10) μm | Dx(50) μm | Dx (90) μm | Mode μm |
|---|---|---|---|---|---|---|
| | 1 | Ecoprime (200 micron) | 67.0 | 181 | 337 | 213 |
| | 3 | Ecoprime (200 micron) | 68.0 | 179 | 335 | 210 |
| | 4 | Ecoprime (200 micron) | 67.8 | 179 | 334 | 210 |
| | 5 | Ecoprime (200 micron) | 67.4 | 179 | 333 | 210 |
| Mean | | | 67.5 | 179 | 335 | 211 |
| 1xStd Dev | | | 0.415 | 0.975 | 1.72 | 1.34 |
| 1xRSD (%) | | | 0.614 | 0.543 | 0515 | 0.635 |

Part A: Polymer Slurry Preparation

The slurry delivery system consisted of an inverted, 1000 mL syringe pump with a 3500 mL stirred slurry reservoir. A polymer slurry, consisting of post-consumer recycled polyethylene, EcoPrime, ground to an average particle size of approximately 200 μm in cyclohexane, was transferred from a stirred bottle, via pressure differential, through a stainless steel cannula into the 3500 mL stirred slurry reservoir. The slurry was then diluted in the reservoir to the required concentration (7 wt. %) with purified cyclohexane. Once the slurry was transferred and diluted, it was stirred in the reservoir for a minimum of 15 minutes before any was transferred into the Syringe pump. When the slurry was ready to be transferred to the reactor, an air actuated solenoid valve, which isolated the reservoir from the Syringe barrel, was opened allowing slurry flow to the syringe barrel. The syringe barrel was then loaded to the desired volume at a flow of 25 mL/min, with constant stirring in the syringe barrel. When the syringe barrel was filled to the required volume, the solenoid valve to the reservoir was closed, isolating the syringe barrel from the reservoir. The Syringe barrel was then brought up to the reactor pressure while still isolated from the reactor. When the syringe barrel has reached the reactor pressure, an air actuated Solenoid valve (which isolated the syringe barrel from the reactor) was opened. The Syringe pump was then calibrated and programmed to deliver the desired flow rate of slurry.

Part B: Continuous Polymerization Experiments

Continuous polymerizations were conducted on a continuous polymerization unit (CPU) using cyclohexane as the solvent. The CPU contained a 150 mL stirred reactor and was operated between 130 to 190° C. for the polymerization experiments. An upstream mixing reactor having a 20 mL volume was operated at 5° C. lower than the polymerization reactor. The mixing reactor was used to pre-heat the ethylene, octene and some of the solvent streams. Catalyst feeds (xylene or cyclohexane solutions of titanium phosphinimine complex, $(Ph_3C)[B(C_6F_5)_4]$, and MMAO-7/BHEB) and additional solvent were added directly to the polymerization reactor in a continuous process. MMAO-7 and BHEB solution flows were combined prior to the reactor to ensure that all of the phenolic OH had been passivated through reaction with the MMAO-7 prior to reaching the reactor.

Copolymers were made at a 1-octene/ethylene weight ratio of 1.0. The CPU system operated at a pressure of 10.5 MPa. The solvent, monomer, and comonomer streams were all purified by the CPU systems before entering the reactor. The polymerization activity, kp (expressed in $mM^{-1}min^{-1}$), is defined as:

$$k_p = \left(\frac{Q}{100-Q}\right)\left(\frac{1}{[Ti]}\right)\left(\frac{1}{HUT}\right)$$

where Q is ethylene conversion (%) (measured using an online gas chromatograph (GC)), [Ti] is catalyst concentration in the reactor (mM), and HUT is hold-up time in the reactor.

Downstream of the reactor the pressure was reduced from the reaction pressure (1500 psi) to atmospheric pressure. The solid polymer was then recovered as a slurry in the condensed solvent and was dried by evaporation and vacuum oven before analysis.

A resin containing high PCR content was prepared by feeding untreated PCR continuously to the reactor while maintaining the polyethylene polymerization reaction.

Gas Phase Example

The purpose of these experiments was to demonstrate that a post-consumer recycled polyolefin could be introduced to a gas phase reactor while maintaining an active reaction.

The Bench Scale Reactor (BSR) was a 2 L autoclave semi-batch reactor operating in the gas phase at 88° C. and 300 psig. Reactor mixing is achieved by a stirred shaft with 4 sets of turbine-like assemblies, with the shaft rotated at a constant speed of 672 rpm.

The reactor was pressure purged with 3 times with purified Nitrogen (0-200 psig) at room temperature. The reactor was then headed to 105° C. and pressure purged an additional 3 times (0-200). In the inventive example 1, the untreated recycled polymer was added to the reactor, that was open to atmosphere, prior to being sealed and pressure purged.

Following the final pressure purges, the reactor pressure was reduced to 2 psig. 1.6 mL of a 25 wt. % solution of triethyl Aluminum in n-hexane was injected into the reactor with a gas tight syringe and stirred for 5 minutes. The reactor temperature was then reduced to 88° C., and 1 mL of purified 1-hexene was added to the reactor. A partial pressure of 24.3 psi of purified Hydrogen, and 156.8 psi of purified Nitrogen was added to the reactor. The reactor was then further pressurized with 114.7 psi of ethylene, with a tandem injection of 81 mg of a Ziegler-Natta catalyst (NOVACAT® T). Following initial ethylene injection, 1-hexene and ethylene were delivered continuously to the reactor at 6.5% mol/mol (hexene/ethylene). The reaction was continued for 60 minutes before ethylene/hexene feeds were stopped and reaction terminated by venting the reactor. The reactor was then purged with nitrogen, with granular product removed after cooling and depressurization. The recovered polymer was weighed to determine catalyst productivity.

The run conditions are provided in Table 3, demonstrating that the catalyst was still active in the presence of the recycled material, and provides evidence that a gas phase polymerization can be completed in the presence of a post consumer recycled material.

TABLE 2

| Sample | 1 | 2 | 3 | 4 | 5 | 6 | 7 | 8 | 9 |
|---|---|---|---|---|---|---|---|---|---|
| titanium phosphinimine (μM) | 3.33 | 12.56 | 21.18 | 19.57 | 21 | 16.67 | 16.98 | 17.31 | 2.22 |
| (Ph3C)[B(C6F5)4] (μM) | 4 | 15.07 | 25.41 | 23.48 | 25.2 | 20 | 20.38 | 20.77 | 2.67 |
| MMAO-7 (μM) | 333.33 | 1255.81 | 2117.65 | 1956.52 | 2100 | 1666.67 | 1698.11 | 1730.77 | 222.22 |
| BHEB (μM) | 100 | 376.74 | 635.29 | 586.96 | 630 | 500 | 509.43 | 519.23 | 66.67 |
| Slurry Flow (mL/min) | 0 | 5 | 10 | 10 | 10 | 10 | 10 | 10 | 0 |
| Total Flow (mL/min) | 54 | 43 | 51 | 46 | 50 | 54 | 53 | 52 | 27 |
| Ethylene (g/min) | 3.6 | 3.6 | 3.6 | 3.6 | 1.4 | 2.5 | 2 | 1.75 | 1.75 |
| Octene/Ethylene (w/w) | 1 | 1 | 1 | 0.83 | 1 | 1 | 1 | 1 | 1 |
| Ethylene Conversion (%) | 90.2 | 90.7 | 92.3 | 86.1 | 89.9 | 86.4 | 86.3 | 82.9 | 90.4 |
| Temperature (° C.) | 190 | 190 | 190 | 190 | 190 | 190 | 190 | 190 | 190 |
| Kp (1/mM * min) | 997 | 224 | 191 | 97 | 141 | 137 | 131 | 97 | 759 |
| PCR content in product (wt %) | 0 | 7.9 | 15.4 | 17.5 | 41.4 | 24.7 | 30.9 | 37.4 | 0 |

TABLE 3

| CATALYST | PE1 NOVACAT T | PE1 NOVACAT T |
|---|---|---|
| Rx Temp (Celsius) | 88 | 88 |
| Catalyst Weight (mg) | 77 | 81 |
| PE Yield Actual Wt. (g) | 25.5 | 8.7 |
| PCR Seedbed (g) | 0.00 | 11.50 |
| Productivity (g PE/g Cat.) | 331 | 107 |
| $C_6$ = Precharge (mL) | 1.00 | 1.00 |
| $P_{ethylene}$ calc (%) | 38.33 | 38.23 |
| $P_{H2}$ calc (%) | 8.07 | 8.20 |
| $C_6$ = Total (mL) | 8.7 | 5.2 |
| Run Time (min) | 61.0 | 61.3 |
| Al:Ti (mol/mol) | 131 | 357 |

INDUSTRIAL APPLICABILITY

The process is associated with post-consumer recyclable (PCR) material. The process is applicable to blending non-polar PCR with virgin polyethylene.

The invention claimed is:

1. A continuous polymerization process for the preparation of a polyethylene polymer blend product comprising a virgin polyethylene and a recycled polyethylene, wherein the continuous polymerization process comprises:
   providing a slurry comprising the recycled polyethylene and a solvent to a continuous polymerization reactor; and
   providing ethylene to the continuous polymerization reactor in the presence of a first catalyst system to provide the polyethylene polymer blend product comprising the virgin polyethylene and the recycled polyethylene;
   wherein:
   the recycled polyethylene is post-consumer and/or post-industrial polyethylene; and
   the solvent comprises a $C_{5-12}$ hydrocarbon, a $C_{5-12}$ hydrocarbon substituted by a $C_{1-4}$ alkyl group, or a combination thereof.

2. The process of claim 1, wherein the process further comprises preparing the slurry comprising the recycled polyethylene and the solvent.

3. The process of claim 1, wherein providing ethylene to the continuous polymerization reactor in the presence of the first catalyst system to provide the polyethylene polymer blend product further comprises providing at least one $C_4$ to $C_{10}$ alpha-olefin comonomer to the continuous polymerization reactor.

4. The process of claim 1, wherein the process further comprises discharging the polyethylene polymer blend product from the continuous polymerization reactor into a tubular reactor, and providing additional ethylene to the tubular reactor that is under polymerization conditions to provide a second virgin polyethylene, wherein the second virgin polyethylene is incorporated into the polyethylene polymer blend product in situ to provide a second polyethylene polymer blend product.

5. The process of claim 1, wherein the first catalyst system is a Ziegler Natta catalyst system or is a single site catalyst system.

6. The process of claim 1, wherein the first continuous polymerization reactor is operated at a temperature from 100° C. to 200° C. or from 100° C. to 140° C.

7. The process of claim 1, wherein the solvent used to make the slurry comprises a solvent chosen from the $C_{5-12}$ hydrocarbon.

8. The process of claim 1, wherein the solvent used to make the slurry comprises a solvent chosen from pentane, methyl pentane, hexane, heptane, octane, cyclohexane, cyclopentane, methylcyclohexane and hydrogenated naphtha.

9. The process of claim 1, wherein the polyethylene polymer blend product comprises from 1% to 50% of the recycled polyethylene.

10. The process of claim 1, wherein the process further comprises discharging the polyethylene polymer blend product from the continuous polymerization reactor into a second continuous polymerization reactor in the presence of a second catalyst system, providing additional ethylene to the second continuous polymerization reactor and operating the second continuous polymerization reactor under polymerization conditions to provide a second virgin polyethylene, wherein the second virgin polyethylene is incorporated into the polyethylene polymer blend product in situ to provide a second polyethylene polymer blend product.

11. The process of claim 10, wherein the second polyethylene polymer blend product is discharged from the second continuous polymerization reactor into a tubular reactor.

12. The process of claim 11, wherein the process further comprises providing ethylene to the tubular reactor under polymerization conditions to provide a third virgin polyethylene, wherein the third virgin polyethylene is incorporated into the second polyethylene polymer blend product in situ to provide a third polyethylene polymer blend product.

13. The process of claim 10, wherein the second catalyst system is a Ziegler Natta catalyst system or is a single site catalyst system.

14. The process of claim 10, wherein the second continuous polymerization reactor is operated at a temperature from 20° C. to 40° C. greater than the operating temperature of the first continuous polymerization reactor.

15. The process of claim 10, wherein each continuous polymerization reactor is operated at a pressure from 1,500 psi to 3,000 psi.

16. The process of claim 10, wherein hydrogen is added to at least one of continuous polymerization reactors.

17. The process of claim 10, wherein the second polyethylene polymer blend product comprises from 1% to 50% of the recycled polyethylene.

18. A continuous polymerization process for the preparation of a polyethylene polymer blend product comprising a first virgin polyethylene, a second virgin polyethylene, and a recycled polyethylene, wherein the continuous polymerization process comprises:
   providing ethylene to a first continuous polymerization reactor in the presence of a first catalyst system to provide the first virgin polyethylene;
   discharging the first virgin polyethylene from the continuous polymerization reactor into a second continuous polymerization reactor;
   providing ethylene to the second continuous polymerization reactor in the presence of a second catalyst system to provide the second virgin polyethylene; and
   providing a slurry comprising the recycled polyethylene and a solvent to the second continuous polymerization reactor to provide the polyethylene polymer blend product;
   wherein:
   the recycled polyethylene is post-consumer and/or post-industrial polyethylene; and
   the solvent comprises a $C_{5-12}$ hydrocarbon, a $C_{5-12}$ hydrocarbon substituted by a $C_{1-4}$ alkyl group, or a combination thereof.

19. A continuous polymerization process for the preparation of a polyethylene polymer blend product in a series of continuous polymerization reactors, wherein the continuous polymerization process comprises:
- providing ethylene to a first continuous polymerization reactor in the presence of a first catalyst system to provide a first virgin polyethylene;
- discharging the first virgin polyethylene from the first continuous polymerization reactor into a second continuous polymerization reactor;
- providing ethylene to the second continuous polymerization reactor in the presence of a second catalyst system to produce a second virgin polyethylene;
- discharging the first virgin polyethylene and the second virgin polyethylene from the second continuous polymerization reactor into a tubular reactor;
- providing ethylene to the the tubular reactor in the presence of a third catalyst system to provide a third virgin polyethylene; and
- subsequently providing a slurry comprising a recycled polyethylene and a solvent to the tubular reactor to provide the polyethylene polymer blend product comprising the first virgin polyethylene, the second virgin polyethylene, the third virgin polyethylene, and the recycled polyethylene;

wherein:
- the recycled polyethylene is post-consumer and/or post-industrial polyethylene; and
- the solvent comprises a $C_{5-12}$ hydrocarbon, a $C_{5-12}$ hydrocarbon substituted by a $C_{1-4}$ alkyl group, or a combination thereof.

* * * * *